United States Patent [19]

Marquis et al.

[11] Patent Number: 5,729,682

[45] Date of Patent: Mar. 17, 1998

[54] SYSTEM FOR PROMPTING PARAMETERS REQUIRED BY A NETWORK APPLICATION AND USING DATA STRUCTURE TO ESTABLISH CONNECTIONS BETWEEN LOCAL COMPUTER, APPLICATION AND RESOURCES REQUIRED BY APPLICATION

[75] Inventors: Eduardo Omar Marquis; James Randolph Pickering, both of Austin; Douglas Cooper Spelce; Russell Arthur Young, both of Round Rock, all of Tex.

[73] Assignee: International Business Machines Corporation, Austin, Tex.

[21] Appl. No.: 484,229

[22] Filed: Jun. 7, 1995

[51] Int. Cl.$^6$ .................................................. G06F 13/00
[52] U.S. Cl. ........................ 395/200.12; 395/670
[58] Field of Search .................. 395/200.01, 200.02, 395/200.03, 200.11, 500, 600, 700; 364/242.94, 280, 281.3, 282.4, 284.4, 286, 940.62

[56] References Cited

U.S. PATENT DOCUMENTS

| | | | |
|---|---|---|---|
| H586 | 2/1989 | Kun | 370/94 |
| 4,080,651 | 3/1978 | Cronshaw et al. | 395/487 |
| 4,423,414 | 12/1983 | Bryant et al. | 340/825.07 |
| 4,530,051 | 7/1985 | Johnson et al. | 395/200.03 |
| 4,644,468 | 2/1987 | Doster et al. | 395/200.02 |

(List continued on next page.)

FOREIGN PATENT DOCUMENTS 932051 10/1993 WIPO.

OTHER PUBLICATIONS

Command Line . . . Network Applications, IBM Technical Disclosure Bulletin, pp. 135–136, Jun. 94.

Simon, S., "Peer–to–Peer . . . SNA Network," IEEE Network Magazine, pp. 30–34, Mar. 91.

"Locating and . . . Remote Files,": IBM Technical Disclosure Bulletin, pp. 2451–2454, Oct. 83.

"Transparent . . . Remote Resources," IBM Technical Disclosure Bulletin, pp. 4230–4231, Dec. 84.

"Remote File . . . Internet Protocol," IBM Technical Disclosure Bulletin, pp. 327–328, Jul. 93.

"Network Based Compute Servers," IBM Technical Disclosure Bulletin, pp. 218–220, Aug. 90.

"Resource Directory . . . Communication," IBM Technical Disclosure Bulletin, pp. 64–68, Aug. 89.

"Communicating with Data Structures," IBM Technical Disclosure Bulletin, pp. 565–570, Jan. 95.

Lewallen,D., "Windows for Workgroups 3.1," PC Computing, v6, n1 p. 202 (3), Jan. 93.

*Primary Examiner*—Thomas C. Lee
*Assistant Examiner*—Anderson I. Chen
*Attorney, Agent, or Firm*—Jeffrey S. LaBaw; David H. Judson

[57] ABSTRACT

A method of sharing network applications in a peer-to-peer computer network environment without use of a centralized repository of network application data. According to the method, a data structure is stored at each of a plurality of computers in the computer network. The data structure contains information on network applications and associated network resources residing elsewhere in the network. In response to a user selection of a network application at a local computer, a connection status of the local computer is stored. The information in the local data structure is then used to establish connections between the local computer and at least one of the plurality of computers where the selected network application resides. The local computer communicates over the connections as required to thereby run the network application. After the network application executes, the local computer is disconnected from the connections and returned to its prior connection status.

16 Claims, 6 Drawing Sheets

U.S. PATENT DOCUMENTS

| | | | |
|---|---|---|---|
| 4,718,005 | 1/1988 | Feigenbaum et al. | 395/200.1 |
| 4,768,150 | 8/1988 | Chang et al. | 395/682 |
| 4,780,821 | 10/1988 | Crossley | 395/670 |
| 4,825,354 | 4/1989 | Agrawal et al. | 395/610 |
| 4,849,877 | 7/1989 | Bishop et al. | 395/200.03 |
| 4,924,378 | 5/1990 | Hershey et al. | 395/187.01 |
| 4,924,384 | 5/1990 | Hao et al. | 395/500 |
| 4,941,084 | 7/1990 | Terada et al. | 395/674 |
| 5,001,628 | 3/1991 | Johnson et al. | 395/600 |
| 5,023,907 | 6/1991 | Johnson et al. | 380/4 |
| 5,047,925 | 9/1991 | Kun et al. | 395/200.01 |
| 5,093,918 | 3/1992 | Heyen et al. | 395/200.08 |
| 5,136,708 | 8/1992 | Lapourtre et al. | 395/650 |
| 5,138,712 | 8/1992 | Corbin | 395/186 |
| 5,142,680 | 8/1992 | Ottman et al. | 395/712 |
| 5,202,983 | 4/1993 | Orita et al. | 395/604 |
| 5,218,699 | 6/1993 | Brandle et al. | 395/684 |
| 5,227,778 | 7/1993 | Vacon et al. | 340/825.52 |
| 5,260,999 | 11/1993 | Wyman | 380/4 |
| 5,263,165 | 11/1993 | Janis | 395/490 |
| 5,276,883 | 1/1994 | Halliwell | 395/700 |
| 5,291,596 | 3/1994 | Mita . | |
| 5,293,619 | 3/1994 | Dean | 395/682 |
| 5,295,266 | 3/1994 | Hinsley et al. | 395/671 |
| 5,357,630 | 10/1994 | Oprescu et al. | 395/610 |
| 5,377,350 | 12/1994 | Skinner | 395/600 |
| 5,404,519 | 4/1995 | Denio | 395/650 |
| 5,448,566 | 9/1995 | Richter et al. | 370/94.1 |
| 5,490,271 | 2/1996 | Elliot et al. | 395/650 |
| 5,557,798 | 9/1996 | Skeen et al. | 395/650 |

SYSTEM FOR PROMPTING PARAMETERS REQUIRED BY A NETWORK APPLICATION AND USING DATA STRUCTURE TO ESTABLISH CONNECTIONS BETWEEN LOCAL COMPUTER, APPLICATION AND RESOURCES REQUIRED BY APPLICATION

TECHNICAL FIELD

The present invention relates generally to computer network resource management and more particularly to a method for managing network applications in a computer network without resort to a dedicated server.

BACKGROUND OF THE INVENTION

Certain computer network architectures do not lend themselves to application management unless a dedicated server having an associated repository of network application data exists in the network. Known client-server network architectures include a domain server having administrative capabilities over other machines in the network. In a "peer-to-peer" environment, however, two workstations interact without the need for a "controlling" host. In the context of a PC local area network, this involves sharing some form of resource without the need for a Server system to initiate the links between the computers. Each individual user controls access to his or her respective workstation, but no particular user in the network can perform administrative functions vis-à-vis another user's workstation. In such an environment, effectively each user is an autonomous participant in the network.

The definition and management of "network applications" in such peer environments is difficult if not impossible. A "network application" is an application to be used by more than one user and that is "non-aware" in that the user (as opposed to an administrator in a domain controller-oriented network) has to provide all connectivity information to enable the application to run. If no domain controller exists on the domain (or if no controller is available), then such applications are not accessible from a remote workstation and cannot be defined by a network administrator. As a result, there is no way for the network users to define and manage network applications and thereby share network resources. These constraints severely limit the flexibility of those computer networks that either do not include or do not provide unrestricted access to a resource management domain server.

BRIEF SUMMARY OF THE INVENTION

It is therefore a principal object of the present invention to provide a method of managing network applications in a computer network without use of a domain controller or other dedicated server device.

It is a further more specific object of the invention to provide a tool that enables users to readily construct network application connectivity definitions in a peer-to-peer environment by defining a local data structure containing information that is used to setup network connections and to start the application.

Another object of the invention is to provide a method for using a network application in a peer network in which the definitions for the application connectivity reside locally on workstations in the network, thereby obviating any central repository of network application connectivity data.

It is still a further object of the invention to provide a method of creating and sharing network application connectivity information in a peer-to-peer network even though the network lacks a domain server or some other centralized repository of data defining the network applications.

It is still another object of the invention to allow network application information to be stored on and available to any user who logs onto a given workstation in a peer network.

These and other objects are provided in a method of managing network applications in a network environment in which workstations do not have access to a dedicated, centralized repository of network application data. According to the method, a data structure is stored locally at one or more of a plurality of workstations from which network applications may be launched. The data structure identifies the network application(s) and includes information that is used to manage the use of the application(s) within the network. In particular, when a user of the workstation selects the resource for use, information in the data structure is used to facilitate the network connections between the initiating workstation and one or more of other workstations of the network where the selected application resource or portions thereof reside. The selected network application is then launched, with the initiating workstation communicating over the network connections as required.

According to the more specific aspects of the invention, the data structure comprises a set of files located on the workstation. A first file contains entries listing each network application that may be launched from the workstation. These entries are termed "application identifiers" and are accessed through the workstation's application selector list. Each user who logs on to the workstation has this list of applications available through the user interface. A second file contains all of the information for each network application definition except passwords, which preferably are encrypted and stored in a separate binary file. A tool is described for use in creating the second file, which typically includes working directory information, command line information, and runtime information used when the network application is started. Within the user interface, the application identifier for each application in the application selector list is presented as a listbox entry or as an icon. When the network application entry or icon is selected, information from its application definition is retrieved and used to setup network connections, prompt for user-supplied parameters, if necessary, and to start the application. Upon exit from the application, the network resources are disconnected and the workstation is returned to its previous state.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
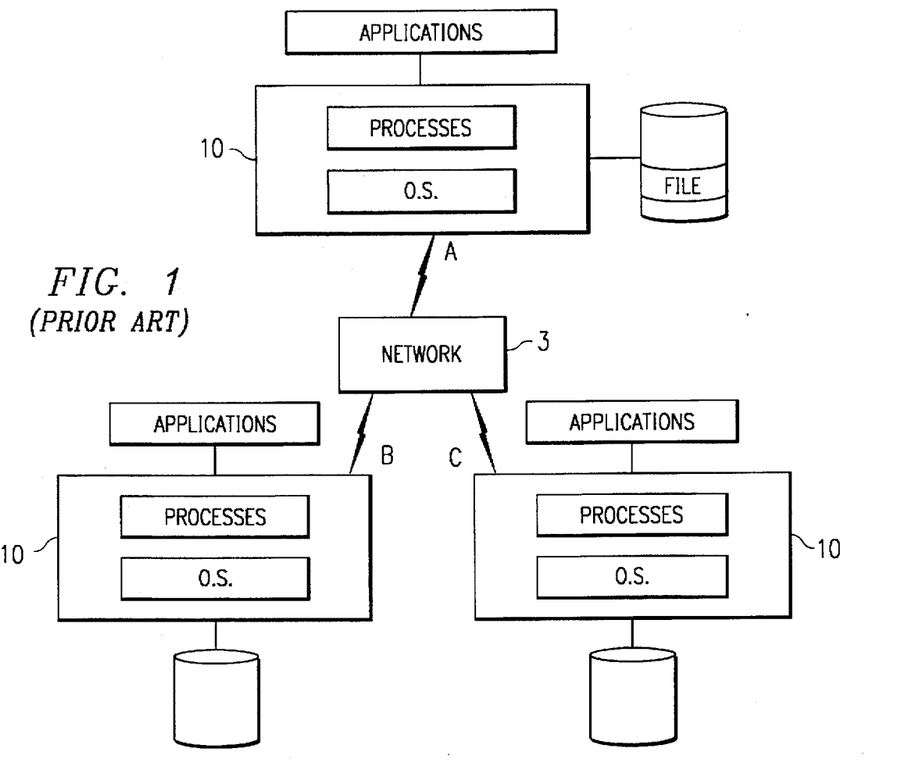
FIG. 1 illustrates a personal computer (PC) local area network (LAN) operating within a peer-to-peer environment.

A known local area network (LAN) is illustrated in FIG. 1 and includes two or more nodes A, B and C connected through a communication link 3. At any of the nodes A, B or C there may be a processing system 10A, 10B or 10C. Each of these systems may be a single user system or a multi-user system.

Each of the processing systems is a computer. For example, each computer may be an IBM® PS/2® running under the OS/2® operating system. For more information on the PS/2® line of computers and the OS/2® operating system, the reader is directed to *Technical Reference Manual Personal Systems/2 Model* 50, 60 *Systems IBM Corporation*, Part No. 68x2224 Order Number S68X-2224 and OS/2® 2.0 *Technical Library, Programming Guide Volumes* 1–3 Version 2.00, Order Nos. 10G6261, 10G6495 and 10G6494.

In one particular implementation, the invention runs on a plurality of IBM P/S2 machines interconnected by the Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers interconnected by other networks than the Ethernet LAN or IBM's TCP/IP.

Figure 2:
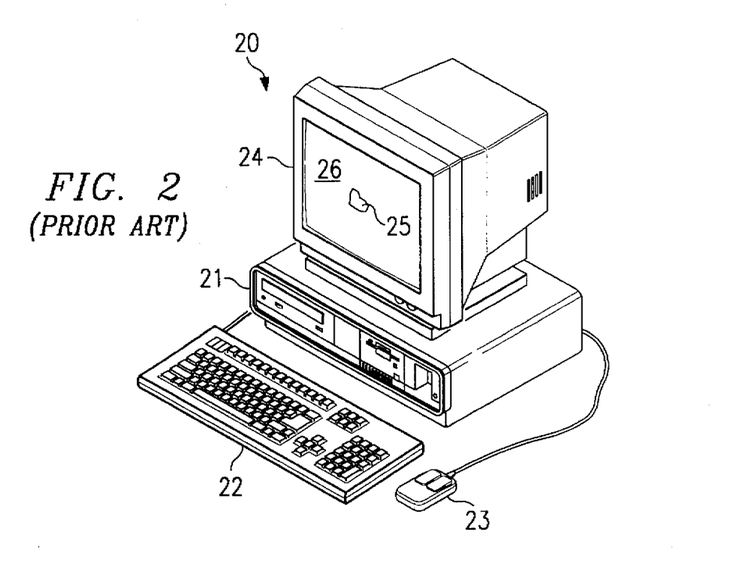
FIG. 2 illustrates a representative personal computer or "workstation" which forms a component of the peer network of FIG. 1.

A representative computer workstation is shown in FIG. 2. A computer 20, comprising a system unit 21, a keyboard 22, a mouse 23 and a display 24 are depicted in FIG. 2. The screen 26 of display device 24 is used to present the graphical user interface (GUI). The graphical user interface supported by the operating system allows the user to use a point and shoot method of input, i.e. by moving the mouse pointer 25 to an icon representing a data object at a particular location on the screen 26 and pressing on the mouse buttons to perform a user command or selection.

Figure 3:
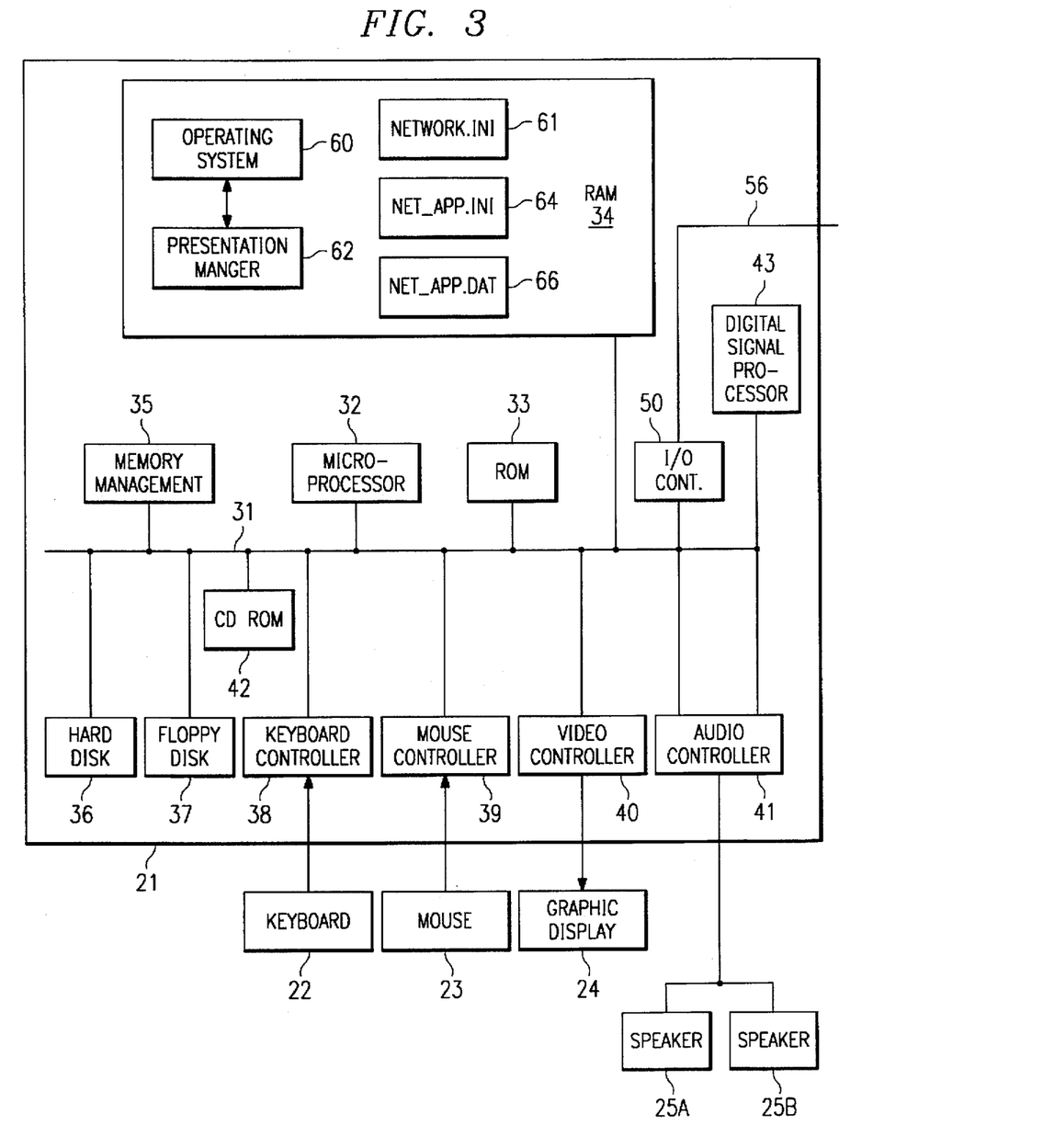
FIG. 3 is a simplified schematic diagram of the personal computer of FIG. 2, with the RAM including a set of files that form a representative data structure according to the present invention.

FIG. 3 shows a block diagram of the components of the personal computer shown in FIG. 2. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM Multimedia P/S2 series of computers is one of the Intel family of microprocessors including the 386 or 486 microprocessors. Other microprocessors including, but not limited to, Intel's Pentium, Motorola's family of microprocessors such as the 68000, 68020 or the 68030 microprocessors, or various RISC microprocessors manufactured by IBM, Hewlett Packard, Sun, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over a network 56 to other similarly configured data processing systems.

Preferably, the invention is implemented in a local area network having a number of machines. Such a network may also be referred to as a "domain," which is sometimes used herein as a shorthand designation for a named set of workstations. For illustrative purposes, the remainder of the detailed discussion is directed to a PC LAN peer domain (although as will be seen the teachings of the invention are applicable to any network environment in which, for purposes of implementing the invention, there is no accessible central repository of network application data).

Peer-to-peer networking involves the interaction between two computers without the need for a controlling host or Server system. Such networking allows groups of users to connect PC's and work together on shared data. Typically, a peer network involves installing network hardware and software on each workstation. The peer software makes resources (such as drives, printers and other devices) from the "server" PC available to the rest of the workstations, and it allows a workstation to initiate a connection to the server PC and thus attach to any of those resources. Many computers can therefore share one resource.

In a peer environment, there is no domain controller or other workstation in which a centralized repository of network application data resides. No particular user in the network can perform administrative functions vis-à-vis another user's workstation. In such an environment, effectively each user is an autonomous participant in the network.

According to the present invention, a "network application" is an application to be used by more than one user and that is "non-aware" in that the user has to provide all connectivity information to enable the application to run. Such information includes all data necessary to identify and establish connections to the application and other associated resources. Prior art peer domains have not included any means of defining, constructing or otherwise implementing network application connectivity without addition of a server for centralized management. It is the principal object of the invention to solve this problem by providing a network management interface in the peer environment while at the same time removing the network's dependency on a central server.

This advantageous result is achieved according to the invention by providing a mechanism through which users can create connectivity definitions for applications installed at other workstations in the network and then add these applications to their application selector list. This technique obviates a domain controller in the peer network to define and manage the network applications.

Referring back to FIG. 3, the network application is defined and managed preferably through the use of three files, called NETWORK.INI 61, NET_APP.INI 64, and NET_APP.DAT 66, which are stored on the peer workstation's hard drive 36 and downloaded into RAM 34 as shown. These files contain information about each network application, such as where it is located on the network (which peer workstation it is installed on), program drive, working directory, passwords, and additional network resources (such as network printers and drives) that are connected when the application is started. A representative network application might be a word processing program (such as WordPerfect) or a spreadsheet (such as Lotus 1-2-3).

The NETWORK.INI file 61 contains a [Network Applications] section, where an entry is listed for each network application that is on the peer workstation's application selector list. It also includes other sections not pertinent to the invention. Each user who logs on to the workstation has this list of applications automatically available within the user interface. The following is the preferred format of the application selector list section:

```
[Network Applications]
appID =<description>
 .
 .
 .
appID =<description>
```

The term "appID" is a shorthand for the application identifier, and the "description" is simply a text form of the application's name.

The NET_APP.INI file 64 contains all the information for each network application definition except for passwords associated with network resources, which are encrypted and stored in the NET_APP.DAT file 66. The [LIST] section in the NET_APP.INI file 64 contains an entry for each network application definition. This section acts as the "master" list of network applications that are defined. The application selector list stored in the NETWORK.INI file 61 is a subset of this list, since the user can choose not to include the application on the selector list at the time the application is defined. It is also possible within the user interface to add and/or delete network applications from the application selector list at any time. The [LIST] section preferably has the following format:

```
[LIST]
appID =<description>
appID =<description>
 .
 .
 .
appID =<description>
```

The rest of the NET_APP.INI file preferably follows the following format for each network application that is defined:

```
[appID]
wrkdir = <type>, <drive>, <remaining_path>, <network_path>
cmdline= <drive>, <remaining_path>, <program_name>,
  <network_path>
parms = <prompt>, <default_parms>
[appID_DRVASN]
<drive> = <network_path>
<drive> = <network_path>
[appID_PTRASN]
<device> = <network_path>
<device> = <network_path>
```

As shown above, the [appID] section preferably has three entries: wrkdir, cmdline and parms. The following table describes these entries in detail:

| Entry | Field | Description |
|---|---|---|
| wrkdir | Working directory information (four components): | |
| | <type> | (Type of working directory: N = none, L = local, R-remote |
| | <drive> | Assigned to working directory; drives A–Z |
| | <remaining_path> | path to working directory |
| | <network_path> | UNC name of alias |
| cmdline | Command line information used to start the application (four components): | |
| | <drive> | Program drive (remote):* = assign to next available |
| | <remaining_path> | Remaining path to program |
| | <program_name> | Program executable name; should have .COM, .EXE, or .BAT (.CMD in the case of OS/2) extension |
| | <network_path> | UNC name of alias application is installed |
| Parms | Runtime information used when the application is started (two components): | |
| | <prompt> | Flag to determine whether to prompt the user for additional run time parameters |
| | <default_parms> | Default parameters used at runtime |

The [app ID-DRVASN] and [app ID-PTRASN] sections may have entries for additional network drives and printers, respectfully. Similar sections may be used for other network devices such as storage devices and other peripherals. However, additional network resources may not be required by the application and are optional in the application definition. The following table is the preferred format description for these entries:

| Entry | Field | Description |
|---|---|---|
| <drive> | Any non-local drive that may be redirected and available <network_path> | UNC name or alias |
| <device> | Any print device; LPT1 to LPT9 | |
| | <network_path> | UNC name of alias |

An "alias" refers to a nickname that points to a server/ netname combination (also called a "uniform naming convention" name or LINC name). A "netname" is the part of the UNC name that points to a resource on any particular workstation. It is known that aliases are only useful directly when the network includes a dedicated domain controller and associated database. According to the invention, however, both aliases and netnames can be specified in the application definition.

Within the user interface, the application ID for each application in the application selector list is presented as a listbox entry or as an icon. When the network application entry (or icon) is selected, information from its application definition is retrieved and used to make network connections, to prompt for parameters, and to start the application. Upon exit from the application, the network resources are disconnected and the workstation returned to its previous state. According to the invention, the computer from which the network application entry is selected is sometimes referred to as the "local" computer, in which case the data structure stored in that computer is referred to as a "local" data structure.

Figure 4:
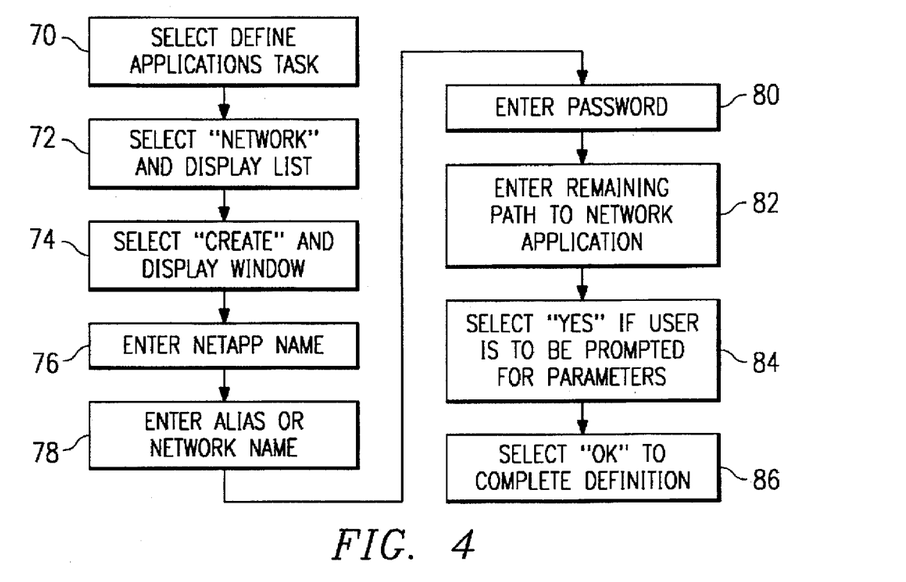
FIG. 4 is a simplified flowchart illustrating a method of creating an application definition according to the invention.

Referring now to FIG. 4, a method is shown for creating a network application definition using the graphical user interface (GUI) displayed on the screen 26 of the computer 20. The method begins at step 70 (but need not follow the precise sequence or steps and therefore may be considered "unordered") with the workstation user selecting a Define Applications task (from a menu bar or by selecting an appropriate icon). At step 72, the user selects "Network" and a list of previously defined network applications for the user ID is displayed, or none at all if no network applications are defined. At step 74, the user selects "Create" and in response, a Create Network Applications window is opened.

Figure 5:
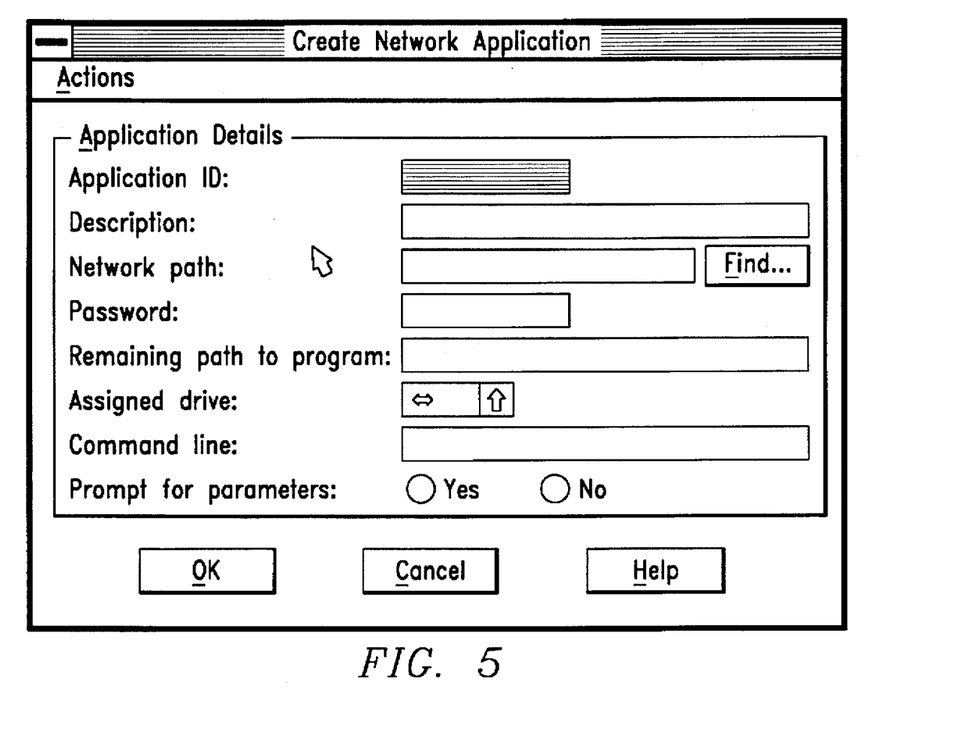
FIG. 5 is a representation of a Create Network Applications Window used to help define the network application.

A representative window is illustrated in FIG. 5 and typically includes a number of fields: an Application ID field 71, a Description field 73, a Network Path field 75, a Password field 77, a Remaining path to program field 79, an Assigned Drive field 81, a Command line field 83, and a Yes/No Selection box 85 to determine whether the user is to be prompted for parameters during the network application setup. Referring back to FIG. 4, at step 76 the user types the name of the network application into the Application ID field 71.

In the Network Path field 75, the user may type the alias or UNC name of the directory in which the application is stored. This is step 78 in the method. If the user does not know the alias or UNC name of the application, he or she may select the Find button (reference number 87 in FIG. 5) to display a Find Shared Directory window from which an available alias or UNC name can be obtained. At step 80, the user types the password (if one is required) in password field 77 for the network path where the application is stored. If the user does not supply a password and one is required, the user is prompted for one when the application is launched. The supplied password is encrypted and stored in the NET_APP.DAT file. Thereafter, the method continues at step 82 with the user entering the remaining path to the application (which is relative to the network path). This is achieved by entering the remaining path to the application in the Remaining path to program field 79. The remaining path should include the directory and any subdirectories (if the application is in a subdirectory of the alias or LINC specified in the Network path field). The Command line field should contain the name of the file that starts the application (usually a file with an extension of .COM, .EXE or .BAT), and any parameters the user desires as defaults when the application is run. If the user desires to be prompted for parameters when the application is run, the method continues at step 84 with the user selected the Yes button; otherwise the No button is selected. At step 86, the user selects the OK button to create the application definition based on the entries made and return to the Define Applications window. The newly-defined application is displayed in the list of application definitions for the workstation. The information entered by the user is placed in the local data structure. At this time, the user is prompted to determine if the network application should be added to the application selection list for access by any user who later logs on to the computer.

Figure 6:
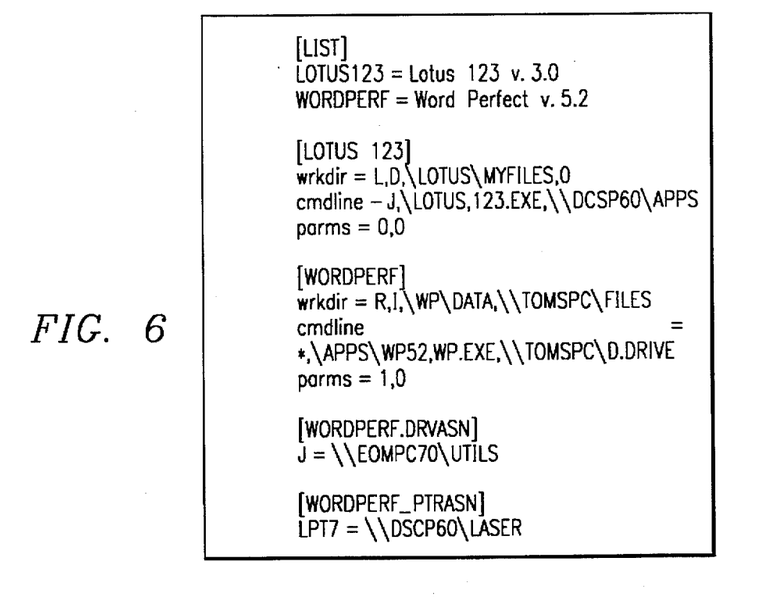
FIG. 6 is an example of a completed NET-APP.INI file, containing the [LIST] section and two network application definitions.

A representative NET_APP.INI file that results from the process is illustrated in FIG. 6. In this example, the network applications being shared are a spreadsheet program (Lotus 1-2-3) and a word processing program (WordPerfect).

Figure 7:
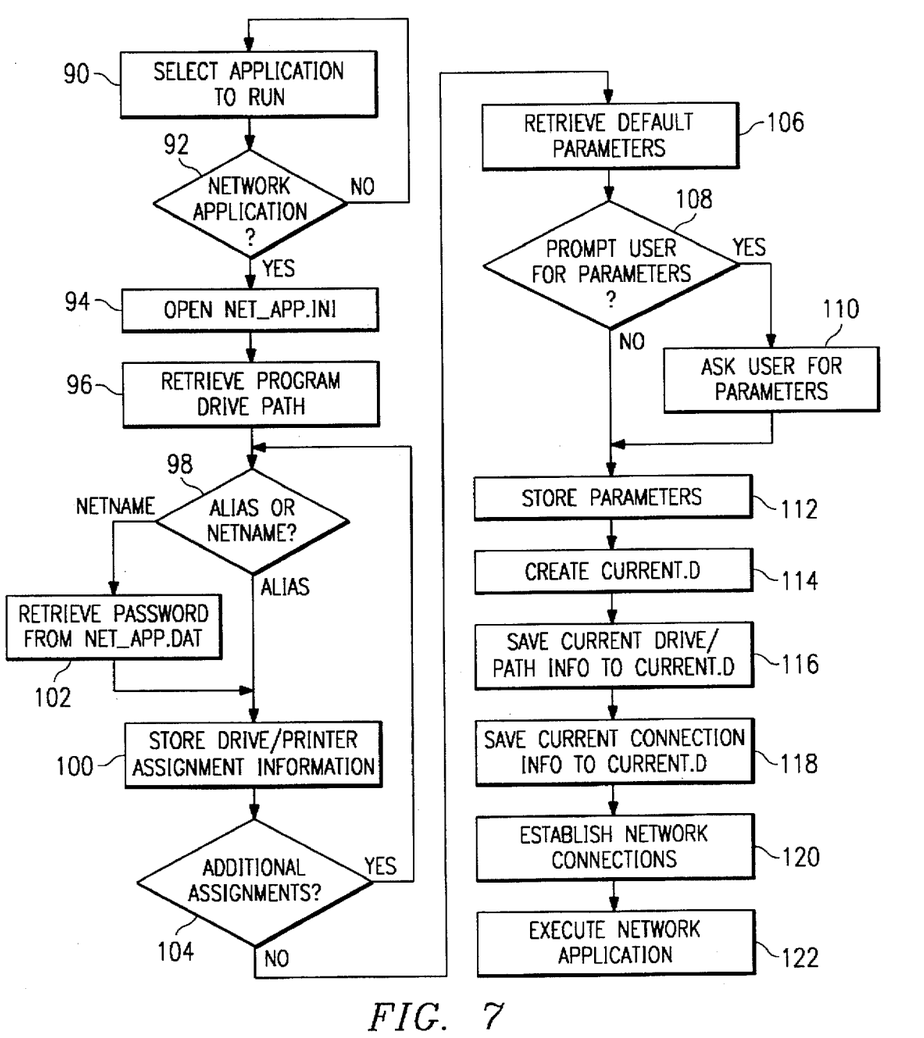
FIG. 7 is a flowchart illustrating a method for launching a network application from, a peer workstation in the network of FIG. 1.

Referring now to FIG. 7, there is illustrated a method of launching a network application from the peer workstation 20. It is assumed that one or more network applications have been defined as described above and the list of available network applications is made available to the user via the display. The method begins at step 90 with the user selecting an application to run. At step 92, a test is made to determine whether or not the selected application is a previously-defined network application. If not, the method attempts to identify the application (as some other type). If, however, the selected application is a network application, the method continues at step 94 by opening the NET_APP.INI file, which as noted above forms part of the local data structure.

According to the invention, once a network application is selected for execution, an internal memory area is allocated in RAM reflecting the fields in the local data structure, and this area is then populated to include the particular information necessary to effect the network connections and to start the application.

In particular, at step 96 the drive path for the application is retrieved and stored in the area. A test is then performed at step 98 to determine whether the program drive path is designated by an alias or a UNC name. If the program drive path is an alias, then the routine continues at step 100 to store the drive/pointer assignment information in the memory area. If the outcome of the test at step 98 indicated that the program drive path was a LINC name, an intermediate step 102 is performed to retrieve the program's password from the NET_APP.DAT file, whereupon the method again continues with step 100 to store the assignment information in the memory area. The routine continues at step 104 to test whether any additional assignment information has been designated. If so, the routine returns to step 98 and loops again. If the outcome of the test at step 104 is negative, the routine then retrieves any default parameters at step 106. At step 108, a test is performed to determine whether the user needs to be prompted for any parameters. If so, the user is prompted for the parameters at step 110, and the parameters are stored (in the memory area) at step 112; alternatively, the outcome of the test 108 is negative, the default parameters are stored in the area by step 112. After this step, the area is populated with the information that has passed from the NET_APP.INI file 64. This data in the memory area is then available to be passed to the function that assigns the network connections, as will be described below.

Before the data is passed, however, the method continues at step 114 to create a CURRENT.D file. This file is used for two purposes: (1) to store any current status or "state" of the network connections on the local computer that conflict with the requirements of the network application, and (2) to store any new connections necessary to run the application. At step 116, the current directory is saved. At step 118, any current connections that conflict with the required connections are saved. At step 120, the network connections are established, and the network application is launched and executed at step 122.

Figure 8A:
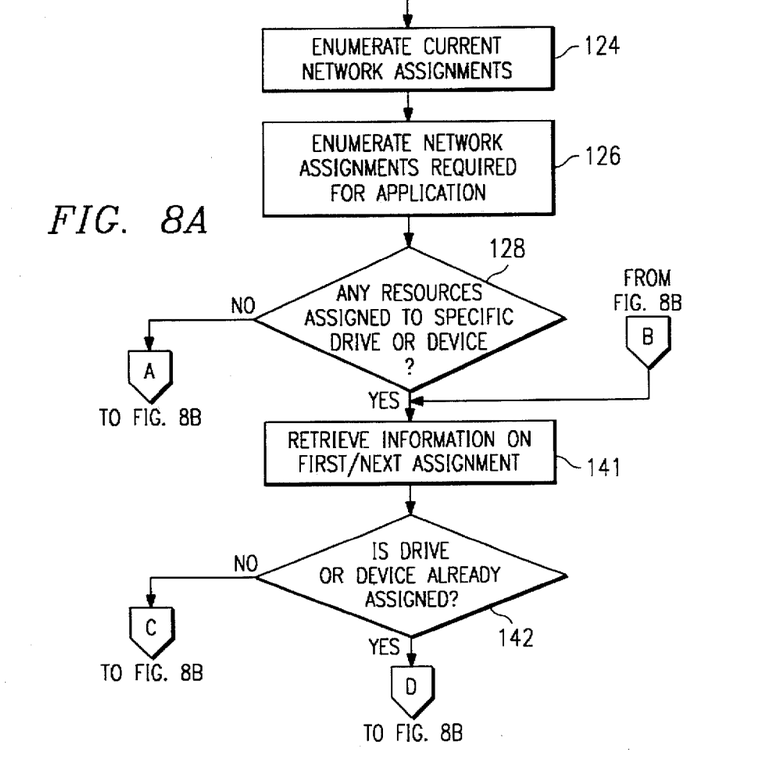
FIG. 8 is a detailed flowchart illustrating a preferred method of making resource connections within the peer network when the network application is launched.
Figure 8B:
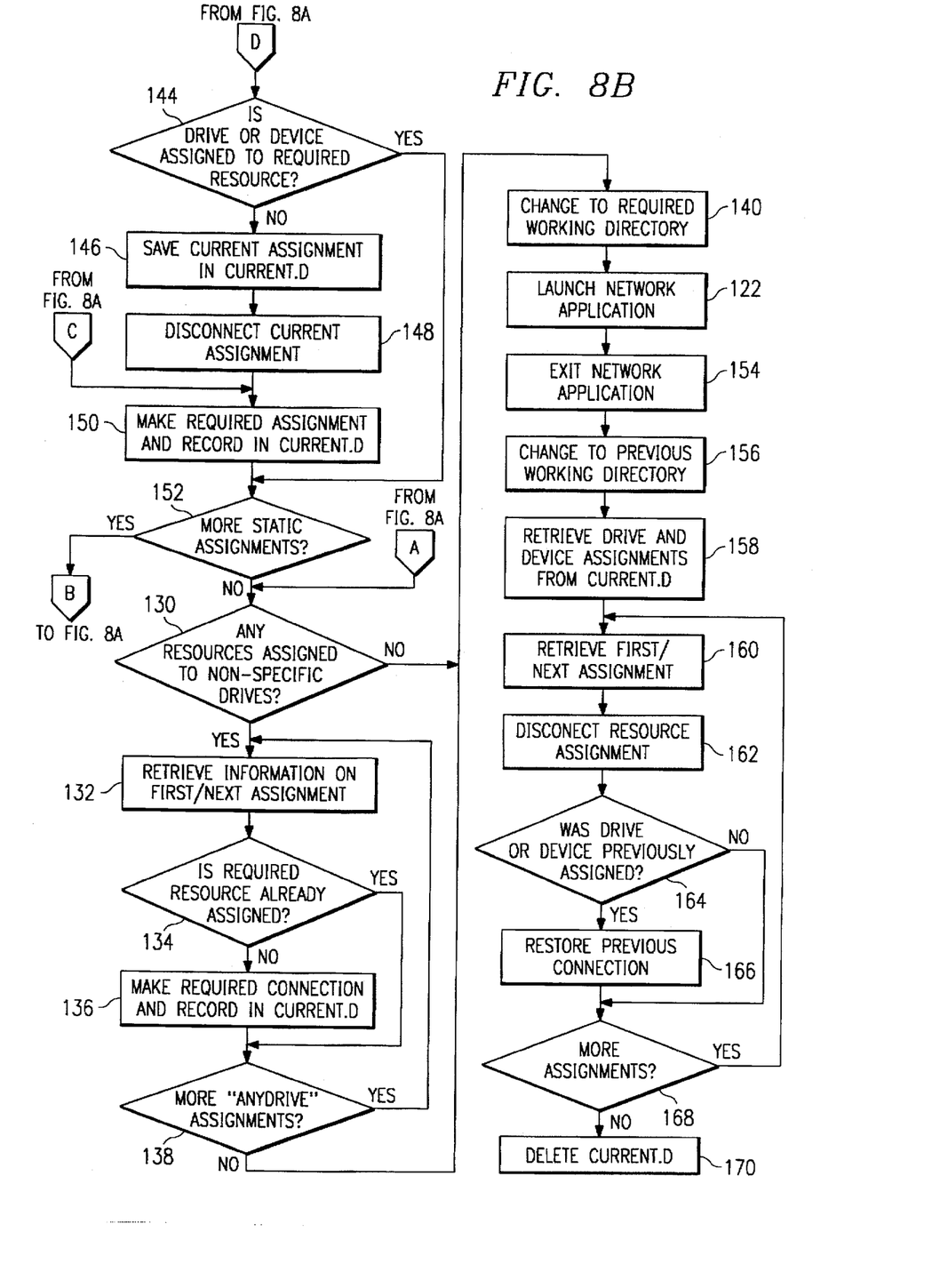

Referring now to FIG. 8, a detailed flowchart is provided illustrating the method for making network connections (i.e.

step 120 in FIG. 7) and for resetting these connections after the network application has been terminated. The method begins at step 124 by obtaining a list of the current network assignments (from the operating system). At step 126, the method stores network assignments required for the network application in an array. A test is then performed at step 128 to determine whether any resources needed by the application are assigned to a specific drive or device. If the outcome of the test at step 128 is negative, the method jumps to step 130 to test whether any resources needed by the application are assigned to non-specific drives. A "non-specific" drive is designated by an "*" indicating that the drive should be assigned to the next available drive. If the outcome of the test at step 130 is positive, the method continues at step 132 to retrieve information (from the array) on the assignments. The method then continues at step 134 to test whether the required resource is already assigned. If not, the method makes the required connection and updates the CURRENT.D record (with the drive or device that was connected) at step 136, and the method continues. Step 136 is also performed when the outcome of the test at step 134 is negative.

The method continues at step 138 to test whether there are more non-specific drive assignments. If so, the method returns to step 132 and the routine loops. If the outcome of the test at step 138 is negative, the routine continues at step 140 to change to the required working directory. Step 140 is also reached when the outcome of the test at step 130 is negative. The network application is then launched at step 122 (as per FIG. 7).

An alternate processing path occurs if the outcome of the test at step 128 is affirmative. In such case, the routine retrieves information on a device assignment at step 141. A test 142 is then performed to determine if the drive or device is already assigned. If so, another test 144 determines whether the drive or device is assigned to the required resource. If the outcome of the test 144 is negative, the routine continues at step 146 by saving the current assignment in the CURRENT.D. If the outcome of the test 144 is positive, the routine jumps to step 152. Given the negative outcome of test 144, the current assignment is disconnected at step 148, and the routine then makes the required assignment (and writes the CURRENT.D record) at step 150. In particular, CURRENT.D is modified to record the prior conflicting information (namely, the LINC name) for later use in returning the computer to its prior connection status. Step 150 is also reached if the outcome of the test at step 142 is negative. At step 152, a test is performed to determine if there are more static assignments. If so, the routine returns to step 141 and loops. If the outcome of the test at step 152 is negative, the routine continues to step 130 as previously described.

The network application is executed by having the local computer use the connections as required. After the network application is run, the method exits the application at step 154, changes to the previous working directory at step 156. At step 158, the method retrieves the drive and device assignments from CURRENT.D that are necessary to return the workstation to its prior state. At step 160, the routine retrieves assignment information, and then disconnects the resource assignment at step 162. A test is then made at step 164 to determine whether the drive or device was previously assigned. If so, the previous connections is restored at step 166; alternatively, a negative outcome of the test at step 164 causes the routine to continue. A test is then made at step 168 to determine if there are more assignments that need to be restored. If no, the CURRENT.D file is deleted at step 170, and the routine ends. If the outcome of the test at step 168 is affirmative, the routine loops back to step 160.

One of the preferred implementations of the invention routine(s) described in FIGS. 7–8 is as a set of instructions in a code module resident in the random access memory 34 of the computer 20. Preferably each of the peer workstations includes such a set of instructions, and the data structure is set up at each of the peer workstations from which it is desired to define and/or launch a network application. Until required by the computer, the set of instructions may be stored in another computer memory, for example, in the hard disk drive 36, or in a removable memory such as an optical disk (for eventual use in the CD ROM 42) or floppy disk (for eventual use in the floppy disk drive 37).

Although the invention has been described in terms of a preferred embodiment in a specific operating system and network environment, those skilled in the art will recognize that the invention can be practiced, with modification, in other and different operating systems and network architectures within the spirit and scope of the appended claims. The invention is not to be construed as limited to the peer domain architecture and thus in a more general sense the invention should be broadly construed to cover any network environment where it is desired to define and manage network applications without use of a domain controller and associated centralized repository of network application data. Also, it is not required that the workstations be implemented with the particular computers illustrated. For example, one of more of the computers may be a RISC System/6000® (a reduced instruction set or so-called RISC-based workstation) running the AIX® (Advanced Interactive Executive) operating system.

Having thus described our invention, what we claim as new and desire to secure by Letters Patent is set forth in the following claims.

What is claimed is:

1. In a computer network, a method of sharing network applications without use of a central repository of network application data, comprising the steps of:

storing a data structure at each of a plurality of computers in the computer network, the data structure containing information on network applications residing remotely in the network;

in response to a user selection of a network application at a local computer, prompting the user to enter one or more parameters required by the network application, and using in the data structure stored at the local computer to establish connections between the local computer and the computer where the network application resides and between the local computer and respective ones of the plurality of computers where network resources required by the network application reside; and having the local computer communicate over the connections as required to thereby run the network application.

2. In the computer network as described in claim 1 wherein the method includes the step of storing a connection status of the local computer prior to establishing the connections.

3. In the computer network as described in claim 2 wherein the method further includes the step of disconnecting the local computer from the connections after the network application is run.

4. In the computer network as described in claim 3 wherein the method further includes the step of returning the local computer to its connection status after the local computer is disconnected.

5. In a peer-to-peer computer network, a method of sharing network applications without use of a centralized repository of network application data, comprising the steps of:

storing a data structure at each of a plurality of computers in the computer network, the data structure containing information on network applications residing on other computers in the network;

in response to a user selection of a network application at a local computer, prompting the user to enter one or more parameters required by the network application, storing any connection status of the local computer that conflicts with connections required to launch the network application, and using information in the data structure stored at the local computer to establish connections between the local computer and the computer where the selected network application resides and between the local computer and respective ones of the plurality of computers where network resources required by the network application reside;

having the local computer communicate over the connections as required to thereby run the network application;

disconnecting the local computer from the connections after the network application is run; and returning the local computer to its prior connection status.

6. In the peer-to-peer computer network as described in claim 5 wherein the step of storing a data structure includes the unordered steps of:

entering working directory information from which the location of a particular network application is determined;

entering command line information for use in starting the particular network application; and entering runtime information for use when the particular network application is started.

7. In the peer-to-peer computer network as described in claim 6 wherein the command line information includes an alias.

8. In the peer-to-peer computer network as described in claim 6 wherein the command line information includes a netname.

9. A storage device readable by a computer system and encoding computer system executable instructions for handing events occurring in an environment in the computer system, the computer system connected as one of a plurality of computers in a peer-to-peer network environment, the storage device comprising:

means for creating and storing in a local data structure a network application definition identifying a network application residing on another computer in the network environment and a connection path to that network application; and means, responsive to a user selection of the network application, for enabling the user to enter one or more parameters, if any, required by the network application, for saving a connection status of the computer system, and for using information in the data structure to establish connections between the computer system and the computer where the selected network application resides and between the computer system and respective ones of the plurality of computers where network resources required by the network application reside;

wherein the means are activated when the storage device is connected and accessed by the computer system.

10. The storage device as described in claim 9 further including:

means, responsive to execution of the network application, for disconnecting the computer system from the connections; and means, responsive to the disconnection of the computer system, for returning the computer system to its prior connection status.

11. A computer system connected as one of a plurality of computers in a peer-to-peer network environment, the computer system comprising:

a processor;

storage means;

a user interface;

network application interface means for managing network applications without use of a centralized repository of network application data, the network application interface means comprising:

means for creating and storing in the storage means a data structure containing information on network applications residing on other computers in the network;

means, responsive to a user selection of a network application via the user interface, for enabling the user to enter one or more parameters required by the network application, and for using information in the data structure to establish connections between the computer system and one of the plurality of other computers in the computer network where the network application resides and between the computer system and respective ones of the plurality of other computers where network resources required by the network application resides;

means for controlling communications over the connections as required to thereby run the network application from the computer system.

12. The computer system as described in claim 11 wherein the network application interface means further includes:

means, responsive to a user selection of the network application, for saving any connection status of the computer system that conflicts with connections required to launch the network application prior to using information in the data structure to establish the connections.

13. The computer system as described in claim 12 wherein the network application interface means further includes:

means, responsive to termination of the network application, for disconnecting the computer system from the connections; and means, responsive to the disconnection of the computer system, for returning the computer system to its prior connection status.

14. The computer system as described in claim 11 wherein the network application interface means is supported on a program storage device whose means are activated when the storage device is connected to and accessed by the processor of the computer system.

15. A computer network, comprising:

a first computer having network application interface means for creating and storing in a local data structure network application definitions identifying network applications and network application definitions identifying network applications and network resources required by the network applications; and a second computer connectable to the first computer and supporting a network application defined by the network application definitions stored in the local data structure of the first computer, whereby in response to a user selection of the network application at the first computer and entry of one or more parameters, if any, required by the network application, information in the local data structure is used to set up and maintain network connections between at least the first and second computers to allow the user to execute the network application from the first computer and using the network resources required by the network application.

16. The computer network as described in claim 15 wherein each of the first and second computers operates in a peer-to-peer manner and there is no central repository of network application data.

\* \* \* \* \*

UNITED STATES PATENT AND TRADEMARK OFFICE
CERTIFICATE OF CORRECTION

PATENT NO. : 5,729,682
DATED : March 17, 1998
INVENTOR(S) : Eduardo Omar Marquis; James Randolph Pickering; Douglas Cooper Spelce; and Russell Arthur Young It is certified that error appears in the above-indentified patent and that said Letters Patent is hereby corrected as shown below:

In the specification, Column 6, line 63, delete "LINC" and substitute --UNC--
In Claim 1, line 46, after using, insert --information--

Signed and Sealed this

Fifth Day of October, 1999

Attest:

Attesting Officer

Q. TODD DICKINSON

Acting Commissioner of Patents and Trademarks